Patented June 2, 1931

1,808,737

UNITED STATES PATENT OFFICE

HUGO G. LOESCH, OF ROCHESTER, NEW YORK, ASSIGNOR, BY MESNE ASSIGNMENTS, TO GENERAL FOODS CORPORATION, OF NEW YORK, N. Y., A CORPORATION OF DELAWARE

METHOD OF PRODUCING CITRUS FRUIT PRODUCTS

No Drawing.    Application filed December 29, 1925. Serial No. 78,235.

My invention relates to the production of pectin and citric acid from citrus fruits and lemons in particular and has for its chief object the provision of a practical and efficient method for accomplishing such production with maximum yields of both products in a high state of purity.

The fruits of the citrus family are much alike in structure, although differing in color, shape, size and flavor. The outer rind is colored and contains in its numerous cavities an essential oil. The inner rind is white, while the fleshy part is made up of vesicles containing the fruit proper.

Lemon juice contains upwards of 6% or more of citric acid.

It is the general opinion that all the pectin of the lemon resides in the white rind. I have found in several tests that if the yellow and white rinds of lemons be separately removed as finely as possible, that the yellow rind contains approximately 15%, the white rind approximately 45% and the fleshy part of the fruit approximately 40% of the total pectin in the fruit. My present invention comprises the extraction of the pectin from the entire lemon and not from the rind only or the white rind in particular as has been generally advocated. Thus I secure the very maximum of pectin from the lemon.

Heretofore in the manufacture of citrate of lime or citric acid from lemons the fleshy part containing the juice has been separated from the rind and the juice expressed; or the lemons have been crushed and pressed and the juice worked up to yield citric acid. In any case considerable pectin has been lost into the juice, which pectin seriously interferes with the separation and purification of the citric acid. Further, the cellular material of the fleshy part or a considerable part of it is lost with the juice and represents pectin loss. My invention further comprises the removal of the pectin from the citric acid juice, thus permitting the subsequent precipitation of a calcium citrate of high purity without the difficulties formerly due to gummy or pectin substances. The citric acid produced from such citrate of lime is of high purity.

The pectin produced in accordance with this invention is completely soluble in water and is not chemically changed during the process of its preparation. It retains its full jellifying power throughout each and every step of the process.

My invention involves, generally speaking, the mechanical pulping or grinding of the whole lemon or other fruit. The mass of juice and ground rind and other substance of the fruit is then processed or heated with water to dissolve the pectin and produce a solution primarily of pectin and citric acid juice. The pectin is then precipitated from the solution by the use of alcohol and the citric acid is then recovered from the hydro-alcoholic mother liquor.

Heretofore, as described above, the lemon juice was separated from the rind; and citric acid was prepared from the juice and pectin from the rind. My method first dissolves out all of the pectin of the fruit into the lemon juce and then proceeds to precipitate the pectin from the citric acid which acid is subsequently precipitated as calcium citrate. My method marks a radical and important departure from present methods and produces in an economical way maximum yields of both products with a minimum of steps.

The following is a more detailed description of my method or process for the preparation of both pectin and citric acid from lemons and its objects and advantages will fully appear from the following explanation of a specific application of the process. The process as described in this example may, of course, be modified in various ways and details without departing from the spirit of the invention.

The whole lemons are ground fine or to a pulp to rupture the cell structure. The mass is then cooked, say 30 minutes at atmospheric pressure with the addition of approximately 2 parts of water, more or less, according to the consistency desired. The mass can be conveniently heated with live steam. It is desirable to regulate the amount of added water so that the resulting pressed out juice will carry, say one to one and one-half parts of sugar i. e. will contain enough pectin to make upwards of 1⅔ to 2½ parts of jelly of commercial strength.

I have found that cooking the lemons for 30 minutes more or less at atmospheric pressure in the highly acid lemon juice does not destroy or impair the jellifying power of the pectin.

The cooked mass is then pressed while hot to separate the solution of pectin and citric acid from the insoluble matter. The expressed solution has an objectionable turbidity which is removed in any suitable way e. g. by settling with a starch solution as described in my copending application, Serial No. 78,234, which has eventuated into Patent No. 1,776,362. The solution is then filtered clear through a pulp filter or any suitable filter with or without filter aids.

The pectin can now be separated from the citric acid by alcohol precipitation but it is desirable to concentrate the solution of pectin and citric acid prior to the pectin precipitation.

The clarified solution is concentrated in vacuo and the concentrate is added to 1 or more volumes of 95% ethyl alcohol with constant stirring. The acid is, of course, concentrated at the same time with the pectin, but I have found that there is little or no destruction or hydrolysis of the pectin or loss of jellifying power during the concentration in vacuo. The concentration can be conveniently carried to a pectin content carrying upwards of 4 or more parts of sugar; at any rate it should be concentrated sufficiently to give a fibrous precipitate on adding the concentrate to the alcohol.

The concentrate is run slowly in thin streams into 95% alcohol, the mass being stirred throughout the whole precipitation. The pectin is precipitated while the citric acid remains in complete solution in the hydro-alcoholic liquor. Any suitably denatured alcohol can be used in this precipitation e. g. alcohol denatured with the addition of 5% ethyl acetate by volume.

The pectin is separated by pressing in a hydraulic or screw press or any suitable press. The pressed precipitate is then freed of mother liquor and water by dehydration, i. e. the precipitate is broken up and soaked with a minimum amount of 95% alcohol and repressed, and a second resoaking with 95% alcohol and repressing is made. The resulting pectin precipitate is white and fluffy. This pectin is then dried and makes clear, colorless and flavorless jellies when combined with the proper proportions of water, sugar and acid.

The mother liquor from the pectin precipitation is now treated to obtain calcium citrate. The mother liquor may be partially or totally dealcoholized and the citric acid precipitated by known means as calcium citrate. The citric acid can be precipitated also directly in the mother liquor by known means.

The mother liquor contains approximately 50% or more of alcohol and it may be settled overnight and then filtered to remove any sediment. Precipitation of the calcium citrate in this hydro-alcoholic mother liquor has several advantages. The citrate is much more insoluble in it than in water. Further, the difference in densities of the precipitate and the solution are increased and the precipitate settles very rapidly and compactly to the bottom of the container as a fine crystalline powder, leaving a clear, bright supernatant liquor. The precipitate is easily and rapidly drained off or filtered from the mother liquor and washed free of any mother liquor. The alcoholic liquor is distilled to recover the alcohol.

The calcium citrate thus obtained is a fine white powder. When it is treated with water and an equivalent of sulphuric acid, calcium sulphate precipitates out, from which the citric acid solution is filtered clear and evaporated in vacuo and allowed to crystallize to obtain the citric acid crystals.

The alcoholic washings from the pectin precipitation, other than the original mother liquor, are weak in citric acid and these can be used with 95% alcohol in subsequent pectin precipitations.

The process, as stated, may obviously be modified in various ways within the spirit of the invention. For example, instead of processing the whole fruit together, the yellow outer rind may be removed from the whole lemons for treatment to extract the lemon oil, and the fruit without the yellow rind processed as described; or the yellow rind after treatment for removal of oil may be added to and processed along with the remainder of the fruit as described; or part of the juice may be removed from the fruit and the residue cooked, as explained, to yield a pectin solution which may then be mixed with the uncooked juice to yield a liquor from which pectin is first precipitated by known means and citric acid then precipitated as calcium citrate. Various other modifications of details of procedure may suggest themselves to those skilled in the art, within the spirit of the invention and the scope of the appended claims.

I claim as my invention:

1. The method of separating the pectin and citric acid of citrus fruits comprising processing the fruit to obtain a solution of pectin and citric acid juice, precipitating the pectin from the said solution and recovering the citric acid from the mother liquor.

2. The method of separating the pectin and citric acid of citrus fruits comprising processing the fruit to obtain a solution of pectin and citric acid juice, precipitating the pectin from the said solution with alcohol and recovering the citric acid from the mother liquor.

3. The method of producing citric acid comprising processing citrus fruit, separating the resulting solution from the mass, precipitating and removing the pectin from said solution, and recovering the citric acid from the mother liquor.

4. The method of producing pectin and citric acid from lemons comprising processing the fruit, separating the resulting solution from the insoluble matter, clarifying this solution, precipitating the pectin therefrom with alcohol and recovering the citric acid in the mother-liquor as calcium citrate.

5. The method of producing pectin and citric acid from lemons comprising processing the fruit, separating the resulting solution from the insoluble matter, clarifying and concentrating this solution, precipitating the pectin in the concentrate with alcohol and then recovering the citric acid in the mother liquor as citrate of lime.

6. The method of producing pectin and citric acid from lemons comprising processing the fruit, separating the resulting solution from the insoluble matter, clarifying the solution with a starch solution, precipitating the pectin in the clarified solution with alcohol and recovering the citric acid in the mother liquor as citrate of lime.

7. The method of producing pectin and citric acid from lemons comprising processing the fruit, separating the resulting solution from the insoluble matter, clarifying the solution with a starch solution, concentrating the clarified solution and then precipitating the pectin in the concentrate with alcohol and recovering the citric acid in the motor liquor as citrate of lime.

8. The method of producing lemon pectin comprising processing the fruit, expressing the resulting solution from the mass, clarifying with a starch solution, concentrating the clear solution, precipitating the pectin by adding the concentrate to alcohol and dehydrating and drying the precipitate.

9. The method of producing citric acid comprising processing citrus fruit to obtain a solution of pectin and citric acid juice, precipitating and removing the pectin from said solution and recovering the citric acid from the mother liquor.

10. The method of producing citric acid comprising processing citrus fruit to obtain a solution of pectin and citric acid juice, precipitating and removing the pectin from said solution and then precipitating the citric acid from the mother liquor as calcium citrate.

11. The method of producing citric acid comprising pulping citrus fruit, processing the mass to obtain a solution of pectin and citric acid juice, precipitating the pectin with alcohol and removing it from said solution, and then precipitating the citric acid as calcium citrate.

12. The method of producing citric acid from lemons comprising processing the fruit, expressing the resulting solution from the mass, clarifying and concentrating the clear solution, precipitating the pectin by adding the concentrate to alcohol, pressing the precipitate and then precipitating the citric acid in the hydro-alcoholic mother liquor as calcium citrate.

13. The method of producing citric acid comprising obtaining the citric acid and pectin contents of citrus fruits in one solution, treating said solution to first precipitate and then remove the pectin and finally precipitating the citric acid as calcium citrate.

HUGO G. LOESCH.